US006482897B1

(12) United States Patent
Weider et al.

(10) Patent No.: US 6,482,897 B1
(45) Date of Patent: Nov. 19, 2002

(54) PROCESS FOR PRODUCING ABS MOULDING COMPOSITIONS HAVING A HIGH RUBBER CONTENT

(75) Inventors: Richard Weider, Leverkusen (DE); Gisbert Michels, Köln (DE); Frank Wingler, Leverkusen (DE)

(73) Assignee: Bayer Aktiengesellschaft (DE)

( * ) Notice: Subject to any disclaimer, the term of this patent is extended or adjusted under 35 U.S.C. 154(b) by 0 days.

(21) Appl. No.: 08/907,202

(22) Filed: Aug. 6, 1997

(30) Foreign Application Priority Data

Aug. 13, 1996 (DE) .......................... 196 32 556

(51) Int. Cl.[7] .......................... C08F 279/04; C08F 2/06
(52) U.S. Cl. ................. 525/242; 525/260; 525/263; 525/316; 525/266
(58) Field of Search ................. 525/316, 266, 525/242, 260, 263

(56) References Cited

U.S. PATENT DOCUMENTS

| 3,449,471 A | | 6/1969 | Weitsel et al. ............ 525/266 |
| 3,538,190 A | | 11/1970 | Meredith et al. ......... 525/261 |
| 3,904,709 A | * | 9/1975 | Morimoto et al. ........ 525/256 |
| 4,421,895 A | * | 12/1983 | Echte et al. ............. 525/53 |
| 4,587,294 A | | 5/1986 | Matsubara et al. ........ 525/53 |
| 4,925,896 A | * | 5/1990 | Matarrese et al. ......... 525/53 |
| 5,250,611 A | | 10/1993 | Baumgartner et al. |
| 5,278,253 A | | 1/1994 | Baumgartner et al. ..... 525/316 |
| 5,286,792 A | | 2/1994 | Wu et al. .............. 525/84 |
| 5,387,650 A | | 2/1995 | Baumgartner et al. |
| 6,114,461 A | * | 9/2000 | Preti et al. ............ 525/298 |

FOREIGN PATENT DOCUMENTS

| DE | 25 16 834 | 11/1975 |
| EP | 0 277 687 | 8/1988 |
| EP | 0 376 232 | 7/1990 |
| EP | 0 632 072 | 1/1995 |
| EP | 0 657 459 A1 | 4/1995 |
| EP | 0 700 941 | 3/1996 |

OTHER PUBLICATIONS

Wingler et al. (translaton of EP 700 941), Mar. 1996.*

* cited by examiner

Primary Examiner—Jeffrey Mullis
(74) Attorney, Agent, or Firm—Connolly Bove Lodge & Hutz LLP

(57) ABSTRACT

A process for producing impact-resistant moulding compositions, which is characterised in that a monomer mixture comprising

- 90 to 20 parts by weight of an aromatic monoalkenyl compound,
- 10 to 50 parts by weight of an ethylenically unsaturated nitrile,
- 0 to 30 parts by weight of other copolymerisable compounds is polymerised by a radical mechanism in the presence of

- 15 to 50 parts by weight, per 100 parts by weight of monomers, of a soluble, gel-free butadiene polymer, and in the presence of
- 50 to 200 parts by weight, per 100 parts by weight of monomers, of a solvent, wherein the solvent is selected from the group comprising an aliphatic ($C_1$–$C_8$) or cycloaliphatic alcohol, ketone, ether, ester, nitrile (A) or mixtures thereof or a mixture of (A) with an aliphatic ($C_4$–$C_{10}$), cycloaliphatic or aromatic hydrocarbon (B) in an A:B weight ratio of 100:0 to 30:70, and the polymerisation is conducted as far as a polymer content of the total mixture of 30 to 70% by weight, with thorough mixing and optionally with the subsequent addition of a regulator and initiator, so that the isolated thermoplastic moulding composition contains 20 to 40% by weight of butadiene polymer.

19 Claims, 1 Drawing Sheet

PROCESS FOR PRODUCING ABS MOULDING COMPOSITIONS HAVING A HIGH RUBBER CONTENT

This invention relates to a single-step polymerisation process for producing impact-resistant, thermoplastically processable moulding compositions by the radical-induced polymerisation of aromatic monoalkenyl compounds, ethylenically unsaturated nitriles, and optionally of other copolymerisable compounds, in the presence of soluble, gel-free polybutadiene rubber as a graft base in the solvent.

The process according to the invention is characterised by its simple polymerisation technique and cost-effectiveness, and the products according to the invention are characterised by their high impact-resistance, and at the same time by their high hardness, translucency, matt surface, light self-colour and outstanding processability.

Low polymerisation temperatures and pressures impart a high degree of operational reliability to the process according to the invention.

The object of the invention is an economical, operationally reliable process for producing thermoplastically processable ABS moulding compositions, which can be carried out in equipment which is technically simple and which provides ABS with good processing and application properties and with outstanding impact-resistance of the graft rubber. A further object of the invention is to provide ABS moulding compositions having a high rubber content which are suitable as mixture components and impact-resistance modifiers, and which are equivalent to the moulding compositions which can be produced by aqueous emulsion polymerisation.

The present invention relates to a process for producing impact-resistant thermo-plastic moulding compositions, which is characterised in that a monomer mixture comprising

- 90 to 20 parts by weight of an aromatic monoalkenyl compound,
- 10 to 50 parts by weight of an ethylenically unsaturated nitrile,
- 0 to 30 parts by weight of other copolymerisable compounds is polymerised by a radical mechanism in the presence of

- 15 to 50 parts by weight, per 100 parts by weight of monomers, of a soluble, gel-free butadiene polymer and in the presence of
- 50 to 200 parts by weight, per 100 parts by weight of monomers, of a solvent, (monomer mixture+butadiene polymer+solvent)

wherein the solvent is selected from the group comprising an aliphatic ($C_1$–$C_8$) or cycloaliphatic alcohol, ketone, ether, ester, nitrile (A) or mixtures thereof or a mixture of (A) with an aliphatic ($C_4$–$C_{10}$), cycloaliphatic or aromatic hydrocarbon (B) in an A:B weight ratio of 100:0 to 30:70, and the polymerisation is conducted as far as a polymer content of the total mixture of 30 to 70% by weight, with thorough mixing and optionally with the subsequent addition of a regulator and initiator, so that the isolated thermoplastic moulding composition contains 20 to 40% by weight of butadiene polymer.

In a preferred embodiment, the polymer content of the total mixture is 30 to 60% by weight, particularly 35 to 50% by weight, the total content of solvent is 25 to 60% by weight, and the residue comprises unconverted monomers, these features being present simultaneously. The content of butadiene polymer in the moulding composition is 20–40% by weight, preferably 25 to 40% by weight, particularly 28 to 40% by weight.

The products according to the invention are characterised by a low degree of grafting between 0.05 and 1, preferably between 0.2 and 0.8. In this connection, the degree of grafting is the ratio $$\frac{gel\ content - rubber\ content}{rubber\ content}$$

The gel content means the fraction of the moulding composition which is insoluble in tetrahydrofuran. The products contain a finely dispersed rubber phase with particle sizes between 0.05 and 10 $\mu$m, preferably between 0.05 and 5 $\mu$m.

In this respect, the particle size denotes the weight average of the particle size distribution. It is determined using an ultracentrifuge.

The products with a high rubber content which are produced according to the invention can be used as such; however they are preferably mixed, by the normal methods of plastics processing, with co- or terpolymers of aromatic monoalkenyl monomers, ethylenically unsaturated nitrile monomers and optionally with other copolymerisable vinyl monomers and/or maleic monomers, in a weight ratio of 1:0.25 to 1:10, to form moulding compositions which likewise have a high impact-resistance but the hardness of which is improved.

Bulk and solution polymerisation for the production of rubber-modified moulding compositions are known, and are described in Houben-Weyl, Methoden der Organischen Chemie, Volume E 20/Part 1, pages 182–217, Georg Thieme Verlag, Stuttgart.

Small proportions of solvents of groups (A) or (B) can be added during bulk polymerisation (see US-PS 4 587 294, US-PS 5 286 792, EP-A 376 232, US-PS 5 278 253). However, high temperatures are required in the final stage, the polymerisation has to be conducted under elevated pressure, and high viscosities occur which can only be dealt with in a controlled manner by the use of expensive techniques such as tower reactors, static mixer reactors, paddle reactors, amongst others.

The use of solvents (B) on their own has also been described for bulk polymerisation (see EP-A 277 687, EP-A 657 459, US-PS 3 538 190, DE-A 2 516 834, US-PS 3 449 471), where they are used in small amounts for dilution purposes.

The contents of rubber in the polymerisation mixture are likewise low.

Higher contents of rubber are not possible, due to the extremely high viscosities which then occur.

Amongst their other features, non-aqueous polymerisation processes result in improved product properties, such as self-colour, translucency, rubber efficacy and matt surfaces. Aqueous effluents do not arise. These advantages are achieved according to the present invention by a simple technique, at low polymerisation temperatures of 60 to about 150° C., preferably 70 to 120° C., under normal pressure or under only slightly elevated pressure, wherein the viscosities which occur are less than 150 Pa·s only. ABS resins having a high rubber content of up to about 40% by weight can also be produced according to the invention. ABS resins with a high rubber content such as these are required as additives for thermoplastics. Hitherto, it has only been possible to produce them by polymerisation in aqueous emulsion. The products according to the invention are characterised by their outstanding processing properties and properties in use.

Due to the rubber content in the ABS resin being considerably higher than that obtained with bulk polymerisation, and due to the simpler technique employed, the economic disadvantages of the larger amounts of solvents used are also compensated for.

The essence of the present invention is the conjoint use of larger amounts of a solvent or of a solvent mixture of group (A) defined above, together with high rubber contents in the monomer mixture and in the final product and incomplete conversion of the monomers. When solvents or solvent mixtures of group (A) and optionally of group (B) are used in the given weight ratios of 1:0 to 3:7, it is possible rapidly to pass through a phase inversion when sufficient conversion has occurred, despite the higher rubber content, so that a finely dispersed phase of graft rubber is formed. On departing from the ratios according to the invention, e.g. when exclusively using solvents of group (B), this phase inversion is no longer obtained and a sharp increase in viscosity occurs, or a premature phase inversion occurs, whereupon the disperse phase which is then formed is of a coarse particulate nature due to insufficient grafting, so that poor product properties are obtained and thick deposits occur in the reactor. Although the solvents of group (A) do not dissolve rubbers, they can be added in a large amount, even before the commencement of polymerisation and even when there are high contents of rubber in the monomer mixture, without precipitation of the rubber occurring. On the contrary, particularly advantageous Theological behaviour of the polymerisation solutions and favourable product properties can be obtained by this measure.

Figure 1:
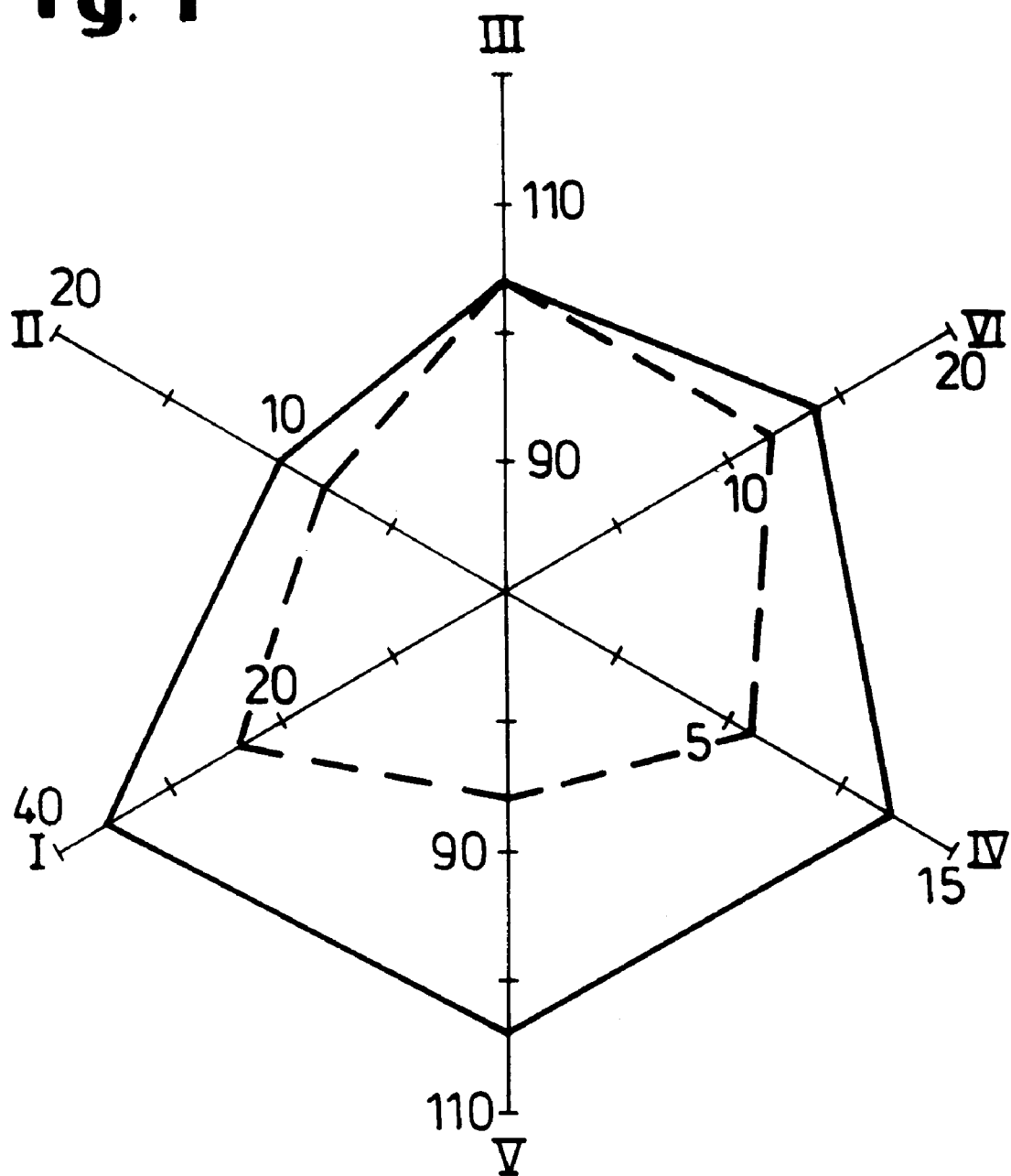
FIG. 1 illustrates the test data of Example 6 compared with a product produced by bulk polymerisation ("Magnum 3504", DOW). The properties measured were the notched bar impact strengths ($a_K$–IZOD) at 23° C. (I) and –40° C. (II), the resistance to thermal deformation (Vicat B/120) (III), the melt volume index MVI (10/220) (IV), the hardness (HC 30" in MPa) (V) and the rubber content of the product (% by weight) (VI). The unbroken line (-----) corresponds to Example 6, and the dashed line (-----) corresponds to "Magnum 3504".

The process according to the invention can be conducted batch-wise, semi-continuously or continuously. In the continuous embodiment, the solution of monomers and rubber in the solvents can advantageously be polymerised in a continuously fed, thoroughly mixed and stirred tank reactor with a steady-state monomer conversion after phase inversion in the first step of more than 10% by weight with respect to the sum of monomers, and the radical-induced polymerisation can be continued in at least one further step as far as a monomer conversion of 30 to 70% by weight with respect to the sum of the monomers, with thorough mixing being effected in one or more further continuously operated stirred tank(s) in cascade, or in a graft flow reactor which provides thorough mixing, and/or in a combination of both types of reactor. Residual monomers and solvents can be removed by conventional techniques (e.g. using recuperative evaporators, flash evaporators, long-tube evaporators, thin film or thin layer evaporators) and recycled to the process. It may also be advantageous to conduct the continuous process in three steps, the first step being operated at a steady-state monomer conversion before phase inversion of less than 10% by weight and the other steps being operated at the conversions described above.

Batch-wise and semi-continuous polymerisation can be conducted in one or more filled or partially filled thoroughly mixed stirred tanks connected in series, with the monomers, the rubber and the solvents being placed in the tanks and polymerisation being conducted as far as the given monomer conversion of 30 to 70% by weight.

To obtain improved thorough mixing and separation of the rubber fed in, the polymer syrup can be pumped in circulation via elements which provide thorough mixing and shear, both in continuous and in batch-wise operation. "Loop operations" such as these are known in the art, and can be useful for adjusting the particle size of the rubber. However, it is more advantageous if the shearing elements are disposed between two separate reactors in order to prevent back-mixing, which results in a broadening of the particle size distribution.

The average dwell time is 1 to 10 hours. Polymerisation is advantageously conducted at 60 to 120° C., preferably at the boiling point of the solvent/polymer mixture. It is advantageous to conduct the polymerisation under normal pressure, but polymerisation is also possible under a slight overpressure up to 6 bar.

The viscosities of the media which are stirred or transported vary within the region of 150 Pa·s as a maximum.

The graft polymer can be isolated in the known manner, by precipitation in solvents, by stripping with water and/or steam or by evaporation to form a polymer melt, e.g. in flash evaporators, long-tube evaporators, helical coil type evaporators, thin film evaporators, certain thin layer evaporators, falling film evaporators or screw evaporators.

Solvents and residual monomers can also be removed in multi-phase evaporators comprising kneading and stripping devices. It is also possible to employ gas-developing agents or entrainment agents, e.g. steam, in conjunction, but a very low content of residual monomers can also be achieved using simple methods of evaporation without the use of gas-developing agents such as these, despite the large amounts of solvents.

Additives, stabilisers, anti-ageing agents, fillers and parting agents can be added during polymerisation and during the isolation of the polymer.

In electron microscope photographs, after contrasting with osmium tetroxide, the impact-resistant ABS moulding compositions which are produced by the process according to the invention exhibit a mono-or polymodal size distribution of the graft rubber, with a high internal graft fraction and a large "rubber phase volume". Distributions and structures such as these, such as that which is reproduced in FIG. 1, result in advantageous processing properties and properties in use (see US-PS 5 166 261). The rubber particles have diameters from<0.1 to 10 µm.

Solvents of group (A) include alcohols such as methanol, ethanol, propanol, isopropanol, butanol, isobutanol, tert.-butanol, amyl alcohol, isoamyl alcohol, isooctanol and cyclohexanol; ketones such as acetone, methyl ethyl ketone, methyl isopropyl ketone, cyclopentanone and cyclohexanone; ethers such as tetrahydrofuran, dioxane, and ethylene glycol dimethyl, diethyl, dipropyl and diisopropyl esters; esters such as ethyl acetate, propyl acetate, butyl acetate, etc.; and nitriles such as acetonitrile, propionitrile and butyronitrile. Methyl ethyl ketone and acetone are preferred.

Solvents of group (B) include aliphatic hydrocarbons such as butane, pentane, hexane, heptane, octane or the iso derivatives thereof; cycloaliphatic hydrocarbons such as cyclopentane, cyclohexane, alkyl cyclopentanes, alkyl cyclohexanes; and aromatic hydrocarbons such as benzene, toluene, xylenes and ethylbenzene. Toluene and ethylbenzene are preferred.

Mixtures of acetone and ethylbenzene and of acetone and toluene are particularly preferred.

It is also possible to use solvents of group (A) only. Methyl ethyl ketone is then preferred.

Customary molecular weight regulators can be used to adjust the molecular weight, such as mercaptans and olefines, e.g. tert.-dodecyl mercaptan, n-dodecyl mercaptan, cyclohexene, terpineols, dimeric α-methylstyrene, etc., in amounts of 0.05 to 1.0% by weight with respect to the copolymerising monomers.

Suitable initiators for the radical polymerisation are graft-active peroxides which decompose into radicals, such as peroxycarbonates, peroxydicarbonates, diacyl peroxides, perketals or dialkyl peroxides and/or azo compounds or mixtures thereof. Examples include azodiisobutyronitrile, azobutyric acid alkyl esters, and tert.-butyl perpivalate, peroctoate, perbenzoate and perneodecanoate. These initiators are used in amounts of 0.01 to 1% by weight with respect to monomers I. to 3.

Customary additives such as the colorants, anti-oxidants, parting agents and stabilisers which are known to one skilled in the art may be added during polymerisation or before work-up.

Soluble, gel-free butadiene polymers are polybutadienes and also styrene-butadiene copolymers in random and/or block form, with a high 1,2-vinyl fraction from 2 to 40%, preferably from 8 to 25%, with respect to the double bonds, and with molecular weights from 50,000 to 500,000, including branched and star-shaped polymers with gel contents <1000 ppm.

The preferred aromatic monoalkenyl compounds 1. are styrene, α-methylstyrene, alkyl styrenes with substituted nuclei, and chlorostyrenes with substituted nuclei.

The preferred ethylenically unsaturated nitriles are acrylonitrile and methacrylonitrile.

Examples of copolymerisable compounds include acrylic esters such as methyl (meth)acrylate, ethyl (meth)acrylate and tert.-butyl (meth)acrylate, esters of fumaric and itaconic acid, maleic derivatives such as maleic anhydride, maleic acid esters, N-substituted maleinimides such as, advantageously, N-cyclohexyl or N-phenyl-maleinimide or N-alkylphenyl-maleinimide, and also include acrylic acid, methacrylic acid, fumaric acid, itaconic acid or amides thereof.

The ABS moulding compositions with high rubber contents which are produced by the process according to the invention can be compounded in the known manner, preferably in the form of granules, with co- or terpolymers of aromatic mono-alkenyl compounds, ethylenically unsaturated nitriles and optionally other copolymerisable compounds corresponding to the definition given above, to form moulding compositions which likewise have a high impact-resistance but which exhibit improved hardness. Styrene/acrylonitrile copolymers and α-methyl-styrene/acrylonitrile copolymers are preferred. The moulding compositions which have lower contents of rubber which are produced in this manner are characterised by a combination of properties, which has not been achieved hitherto, comprising high toughness and hardness. The properties of these mixtures can be varied within wide limits via the mixture ratio. Moreover, another advantageous of this procedure is that the economics of the overall process are improved, because the graft polymerisation, which is complicated to carry out compared with simple copolymerization, can be carried out in smaller installations.

EXAMPLES

Methods of Measurement

Determination of the conversion was effected either by determining the solids content by evaporation at 200° C. or via on-line near infrared spectroscopy. The progression of the viscosity during polymerisation was determined by recording the torque on the stirrer shaft. The rubber content in the final product was determined either from the mass balance, by IR spectroscopic methods or by measuring the free induction drop (FID) (pulsed NMR; NMS 100 Minispek). Gel contents and degrees of swelling were determined in tetrahydrofuran. Transmission electron microscope (TEM) photographs were taken of ultra-thin sections contrasted with $OsO_4$. The fracture behaviour was investigated by rapid three-point bending (impact loading in a recording falling impact apparatus for standard small bars) using a V notch with a 40 mm span between the support points. The phase structure was investigated by dynamic mechanical measurement of the shear modulus characteristic $G^*(T)$ of standard small bars at a frequency of about 1 Hz over the temperature range from −150° C. to 200° C. using an RDS supplied by Rheometrics.

Examples 1 to 6

Batch-Wise Mode of Operation, Using Methyl Ethyl Ketone as Solvent (A)

Batch polymerisations were conducted in a 5 liter laboratory reactor fitted with a stirrer which operated well at the wall.

The starting batch was prepared by dissolving poly-cis-butadiene rubber with a 1,2-vinyl fraction corresponding to 11% of the double bonds and a 1,4-cis fraction corresponding to 38% of the double bonds (Buna CB HX 502C, Bayer Elastomeres France), "KA1", or poly-cis-butadiene-costyrene, containing 11% styrene, solution viscosity 27.5 mPa·s as a 5% solution in styrene (Buna BL Bayer 8497, Bayer Elastomeres France), "KA2", in monomers, solvents, regulators and auxiliary materials, optionally with the subsequent addition of acrylonitrile and solvents, at 40 to 50° C. under nitrogen. After heating to 75° C., the initiators were added, the batch was subsequently stirred for about 45 minutes until the end of the phase inversion, which could be identified by the decrease in torque. This was followed by the addition of regulators and polymerisation of the batch with the temperature being increased according to the given temperature programme until the final conversion was obtained and stabiliser was added. The following were used as auxiliary materials: 2,5-di-tert.-butylphenol, "St1"; p-2, 5-di-tert.butyl-phenol-propionic acid octyl ester (Irganox 1076®; Ciba-Geigy), "St2"; and DAB viscous paraffin oil (KMF Laborchemie Handels GmbH), "Par". Tert.-dodecyl mercaptan, "DDM", was used as the regulator. Tert-butyl perpivalate (an approximately 60% solution in hydrocarbons), "I1"; tert.-amyl perpivalate (an approximately 60% solution in hydrocarbons), "I2"; and tert.-butyl peroctoate, "I3", were used as initiators. The styrene, "STY", and 2-butanone, "MEK", were distilled before use. Acrylonitrile, "AN", was used without purification.

The numerical data given after the components in the Table denote grams.

| Ex. | Starting batch | Initiator/ MEK | t-DDM/ MEK | Temperature programme | Stabiliser/ MEK |
|---|---|---|---|---|---|
| 1 | KA1 256 STY 914 AN 430 MEK 815 | I1 1.5 I2 0.4 MEK 65 | DDM 0.7 MEK 130 | 3 h 82° C. 4 h 90° C. | St2 1.6 MEK 40 |

-continued

| Ex. | Starting batch | Initiator/ MEK | t-DDM/ MEK | Temperature programme | Stabiliser/ MEK |
|---|---|---|---|---|---|
| | DDM 3.4 Stl 0.5 Par. 27 | | | | |
| 2 | KA1 256 STY 914 AN 430 MEK 660 DDM 3.4 Stl 0.5 Par. 27 | I1 1.5 I2 0.4 MEK 65 | DDM 0.7 MEK 130 | 2 h 84° C. 4 h 90° C. | St2 1.6 MEK 40 |
| 3 | KA1 256 STY 914 AN 430 MEK 660 DDM 3.4 Stl 0.5 Par. 27 | I3 1.5 I2 0.4 MEK 65 | DDM 0.7 MEK 130 | 2 h 84° C. 4 h 90° C. | St2 1.6 MEK 40 |
| 4 | KA1 256 STY 914 AN 430 MEK 630 DDM 3.4 Stl 0.5 Par. 27 | I3 1.5 I2 0.4 MEK 65 | DDM 0.7 MEK 130 | 2 h 84° C. 4 h 90° C. | St2 1.6 MEK 40 |
| 5 | KA2 256 STY 914 AN 430 MEK 815 DDM 3.4 Stl 0.5 Par. 27 | I1 1.5 I2 0.4 MEK 65 | DDM 0.7 MEK 130 | 2 h 84° C. 2 h 90° C. | St2 1.6 MEK 40 |
| 6 | KA2 320 STY 870 AN 410 MEK 815 DDM 3.2 Stl 0.5 Par. 27 | I1 1.5 I2 0.4 MEK 65 | DDM 0.6 MEK 130 | 2 h 84° C. 2 h 90° C. | St2 1.6 MEK 40 |

The solutions were then evaporated in a ZSK laboratory screw-type evaporator and granulated. The solid granules were mixed with styrene-acrylonitrile resin (limiting viscosity index: 0.58 dL/g in dimethylformamide+1 g/l LiCI) so that the mixtures contained about 14% by weight of rubber, were extruded using a conical, contra-rotating twin-shaft laboratory screw device supplied by Haake, Karlsruhe, at 117 rpm, and were granulated. The granules obtained in this manner were injection moulded to form standard small bars (injection moulding conditions: material temperature 240° C., mould temperature 70° C., injection moulding time 2.8 seconds).

Product Data

| Ex. | Solids content after polymerisation (% by weight) | Conversion (% by weight) | Rubber content (% by weight) after polymerisation | Rubber content after mixing with SAN | Notched bar impact strength of the mixture (kJ/m$^2$) |
|---|---|---|---|---|---|
| 1 | 35 | 50 | 27.5 | 14 | 31.5 |
| 2 | 36 | 46 | 29.5 | 14 | 31 |
| 3 | 41 | 55.7 | 25.5 | 14 | 26 |
| 4 | 43 | 58 | 25 | 14 | 30 |
| 5 | 30.2 | 41.3 | 31.6 | 14 | 28.7 |
| 6 | 35 | 50 | 34.5 | 14 | 26 |

Excellent notched bar impact strengths were obtained.

Examples 7 to 11

Batch-Wise Mode of Operation, Using Ethylbenzene/ acetone as Solvents (A)+(B)

The batch polymerisations were conducted in a 5 liter laboratory reactor fitted with a stirrer which operated well at the wall, at a pressure $\leq 3$ bar.

The starting batch was prepared by dissolving poly-cis-butadiene rubber with a 1,2-vinyl fraction corresponding to 11% of the double bonds and a 1,4-cis fraction corresponding to 38% of the double bonds (Buna CB HX 502C, Bayer Elastomeres France), "KA1", or poly-cis-butadiene-costyrene, (Buna BL Bayer 8497, Bayer Elastomeres France), "KA2", in monomers, solvents, regulators and auxiliary materials, optionally with the subsequent addition of acrylonitrile and solvents, at 40 to 50° C. under nitrogen. After heating to 75° C., the initiators were added. A further initiator solution was added after 30 minutes. The batch was polymerised with the temperature being increased according to the given temperature programme until the final conversion was obtained, and stabiliser was added. The following were used as auxiliary materials: 2,5-di-tert.-butylphenol, "St1"; 2,2'-methylene-bis-(4-methyl-6-cyclohexylphenol) (Vulkanox ZKF® Bayer AG), "St3"; dilauryl dithiopropionate (Irganox PS 800®; Ciba-Geigy), "St4"; and DAB viscous paraffin oil (KMF Laborchemie Handels GmbH), "Par". Tert.-dodecyl mercaptan, "DDM", was used as the regulator. Tert-butyl perpivalate (an approximately 60% solution in hydrocarbons), "I1", was used as the initiator. The styrene, "STY", was distilled before use. Acrylonitrile, "AN", acetone, "AC", and ethylbenzene, "EB", were used without purification.

The numerical data given after the components in the Table denote grams.

Example 7

|  | Starting batch | Initiator solution I | Initiator solution II | Stabilisation solution |
|---|---|---|---|---|
| KA1 | 504 | | | |
| STY | 1263 | | 24 | |
| AN | 594 | | 15 | |
| EB | 683 | | 37 | |
| AC | 775 | 60 | 45 | 10 |
| DDM | 6.63 | | | |
| St1 | 1.01 | | | |
| St3 | | | | 3.8 |
| St4 | | | | 4.0 |
| Par. | 40 | | | |
| I1 | | 2.21 | 3.16 | |
| Time of metered addition, t [minutes] | | 0 | 30–300 | 420 |
| Temperature programme | | t [min] | T [° C.] | |
| | | 120 | 80 | |
| | | 150 | 85 | |
| | | 210 | 90 | |
| | | 360 | cooling | |

Example 8

|  | Starting batch | Initiator solution I | Initiator solution II | Stabilisation solution |
|---|---|---|---|---|
| KA1 | 504 | | | |
| STY | 1392 | | 31 | |
| AN | 655 | | 18 | |
| EB | 532 | | 28 | |
| AC | 737 | 60 | 43 | 10 |
| DDM | 7.75 | | | |
| St1 | 1.01 | | | |
| St3 | | | | 3.8 |
| St4 | | | | 5.0 |
| Par. | 40 | | | |
| I1 | | 2.10 | 2.45 | |
| Time of metered addition, t [minutes] | | 0 | 30–270 | 390 |
| Temperature programme | | t [min] | T [° C.] | |
| | | 90 | 80 | |
| | | 150 | 85 | |
| | | 210 | 90 | |
| | | 330 | cooling | |

Example 9

|  | Starting batch | Initiator solution I | Initiator solution II | Stabilisation solution |
|---|---|---|---|---|
| KA1 | 504 | | | |
| STY | 1521 | | 38 | |
| AN | 716 | | 21 | |
| EB | 399 | | 21 | |
| AC | 681 | 60 | 39 | 10 |
| DDM | 9.18 | | | |
| St1 | 1.01 | | | |
| St3 | | | | 3.8 |
| St4 | | | | 5.0 |
| Par. | 40 | | | |
| I1 | | 1.92 | 1.92 | |
| Time of metered addition, t [minutes] | | 0 | 30–240 | 360 |
| Temperature programme | | t [min] | T [° C.] | |
| | | 90 | 80 | |
| | | 150 | 85 | |
| | | 210 | 90 | |
| | | 300 | cooling | |

Example 10

|  | Starting batch | Initiator solution I | Initiator solution II | Stabilisation solution |
|---|---|---|---|---|
| KA1 | 504 | | | |
| STY | 1650 | | 45 | |
| AN | 776 | | 25 | |
| EB | 289 | | 15 | |
| AC | 614 | 60 | 36 | 10 |
| DDM | 9.98 | | | |
| St1 | 1.01 | | | |
| St3 | | | | 3.8 |
| St4 | | | | 5.0 |
| Par. | 40 | | | |
| I1 | | 1.66 | 1.66 | |
| Time of metered addition, t [minutes] | | 0 | 30–210 | 330 |
| Temperature programme | | t [min] | T [° C.] | |
| | | 60 | 80 | |
| | | 120 | 85 | |
| | | 180 | 90 | |
| | | 270 | cooling | |

Example 11

Example 11 was carried out similarly to Examples 7 to 10. In departure from Examples 7 to 10, the batch was heated to 90° C. and initiator solution 1 was added from 0 to 80 minutes. Initiator solution II was added from 180 to 270 minutes. After adding the stabilisation solution, the batch was cooled to room temperature.

|  | Starting batch | Initiator solution I | Initiator solution II | Stabilisation solution |
|---|---|---|---|---|
| KA2 | 466 | | | |
| STY | 1326 | | | |
| AN | 591 | | 18 | |
| EB | 512 | | | 40 |
| AC | 965 | 60 | 62 | 40 |
| DDM | 7.74 | | | |
| St1 | 0.93 | | | |
| St3 | | | | 3.5 |
| St4 | | | | 4.7 |
| Par. | 37 | | | |
| I1 | | 3.87 | 2.26 | |
| Time of metered addition, t [minutes] | | 0–180 | 180–270 | 330 |

The solutions were then evaporated in a ZSK laboratory screw-type evaporator and granulated. The solid granules were mixed with styrene-acrylonitrile resin (limiting viscosity index: 0.58 dL/g in dimethylformamide+1 g/l LiCl) so that the mixtures contained about 14% by weight of rubber, were extruded using a conical, contra-rotating twin-shaft laboratory screw device supplied by Haake, Karlsruhe, at 117 rpm, and were granulated. The granules obtained in this manner were injection moulded to form standard small bars (injection moulding conditions: material temperature 210° C., mould temperature 60° C., injection moulding time 2.8 seconds).

Product Data

| Example | 7 | 8 | 9 | 10 | 11 |
|---|---|---|---|---|---|
| Solids content after polymerisation (% by weight) | 42.91 | 42.39 | 42.71 | 41.25 | 38.41 |
| Conversion [%] | 63.97 | 56.02 | 51.73 | 45.21 | 55.8 |
| Rubber content [% by weight] after polymerisation | 28.7 | 29.3 | 29.1 | 30.1 | 29.3 |
| Gel content [%] | 40.42 | 38.90 | 35.1 | 32.2 | |
| Degree of swelling | 17.8 | 17.1 | 17.7 | 18.8 | |
| Rubber content [% by weight] after mixing with SAN resin | 14 | 14 | 14 | 14 | 14 |
| Notched bar impact strength [kJ/m$^2$] of the mixture | 32.3 | 27.3 | 24.8 | 24.9 | 27.5 |

Excellent notched bar impact strengths were obtained.

Example 12
Semi-Continuous Mode of Operation

Semi-continuous polymerisation was conducted in a 5 liter laboratory reactor fitted with a stirrer which operated well at the wall.

The starting batch was prepared by dissolving poly-cis-butadiene rubber with a 1,2-vinyl fraction corresponding to 11% of the double bonds and a 1,4-cis fraction corresponding to 38% of the double bonds (Buna CB HX 502C, Bayer Elastomeres France), "KA1", in monomers, solvents, regulators and auxiliary materials, optionally with the subsequent addition of acrylonitrile and solvents, at 40 to 50° C. under nitrogen. 20% by weight of the starting batch was placed in the reactor, and after heating to 87° C. initiator solution I was added and the batch was subsequently stirred for 45 minutes until the end of the phase inversion, which could be identified by the decrease in torque. This was followed by the addition of the remainder of the starting batch together with initiator solution II over 4 hours at 87° C., whereupon a quasi-steady state conversion set in. After the addition was complete, the batch was polymerised for 3 hours until the final conversion was attained, and stabiliser was added. The following were used as auxiliary materials: 2,5-di-tert.-butylphenol, "St1"; p-2,5-di-tert.butylphenol-propionic acid octyl ester (Irganox 1076®; Ciba-Geigy), "St2"; and DAB viscous paraffin oil (KMF Laborchemie Handels GmbH), "Par". Tert.-dodecyl mercaptan, "DDM", was used as the regulator. Tert-butyl perpivalate (an approximately 60% solution in hydrocarbons), "I1"; tert.-amyl perpivalate (an approximately 60% solution in hydrocarbons), "I2"; and tert.-butyl peroctoate, "I3", were used as initiators. The styrene, "STY", and 2-butanone, "MEK", were distilled before use. Acrylonitrile, "AN", was used without purification.

The numerical data given after the components in the Table denote grams.

| Example | Starting batch | Initiator solution I | Initiator solution II | Stabiliser solution |
|---|---|---|---|---|
| 12 | KA1 384 | I1 0.78 | I1 3.9 | St2 2.4 |
| | STY 1371 | MEK 25 | MEK 215 | MEK 40 |
| | AN 645 | | | |
| | MEK 1000 | | | |
| | DDM 6.05 | | | |
| | St1 0.77 | | | |
| | Par. 40 | | | |

Product Data

| Ex. | Solids content after polymerisation (% by weight) | Conversion (% by weight) | Rubber content (% by weight) after polymerisation | Rubber content after mixing with SAN | Notched bar impact strength of the mixture (kJ/m$^2$) |
|---|---|---|---|---|---|
| 12 | 41.6 | 52.6 | 27 | 14 | 29 |

Example 13
Continuous Mode of Operation

Continuous polymerisation was conducted in a cascade of vessels consisting of a 5 liter and a 10 liter laboratory reactor fitted with stirrers which operated well at the wall, at a pressure ≦3 bar.

The rubber solution was prepared by dissolving the rubber (poly-cis-butadiene with a 1,2-vinyl fraction corresponding to 11% of the double bonds and a 1,4-cis fraction corresponding to 38% of the double bonds (Buna CB HX 502C, Bayer Elastomeres France), "KA1", in monomers, solvents, regulators and auxiliary materials, optionally with the subsequent addition of acrylonitrile and solvents, at 40 to 50° C. under nitrogen. Initiator solution I was introduced into reactor I (volume: 5 liters), and initiator solution II was introduced into reactor II (volume: 10 liters). The stabilisation solution was introduced into the discharge from reactor II.

The composition of the solutions and of the additive streams, the average dwell times and the reactor temperatures are given in the following Tables.

The following were used as auxiliary materials: 2,5-di-tert.-butylphenol, "St1"; 2,2'-methylene-bis-(4-methyl-6-cyclohexylphenol) (Vulkanox ZKF® Bayer AG), "St3"; dilauryl dithiopropionate (Irganox PS 800®; Ciba-Geigy), "St4"; and DAB viscous paraffin oil (KNF Laborchemie Handels GmbH), "Par". Tert.-dodecyl mercaptan, "DDM", was used as the regulator. Tert-butyl perpivalate (an approximately 60% solution in hydrocarbons), "I1", was used as the initiator. The styrene, "STY", was distilled before use. Acrylonitrile, "AN", acetone, "AC", and ethylbenzene, "EB", were used without purification.

|  | Rubber solution | Initiator solution I | Initiator solution II | Stabilisation solution |
|---|---|---|---|---|
| KA1 | 3528 |  |  |  |
| Par. | 280 |  |  |  |
| EB | 3360 |  |  | 420 |
| AC | 6097 | 1078 | 658 | 420 |
| STY | 9037 |  |  |  |
| AN | 1554 | 2506 | 182 |  |
| DDM | 46.48 |  |  |  |
| I1 |  | 17.73 | 53.08 |  |
| St1 | 7.06 |  |  |  |
| St3 |  |  |  | 26.46 |
| St4 |  |  |  | 35.28 |
| Additive stream [g/h] | 1736.9 | 264.1 | 59.7 | 58.4 |

|  | Reactor I | Reactor II |
|---|---|---|
| Average dwell time | 1 | 3 |
| T [° C.] | 90 | 90 |
| Conversion [% by weight] | 14.45 | 60.42 |

The solution was then evaporated in a ZSK laboratory screw-type evaporator and granulated. The solid granules were mixed with styrene-acrylonitrile resin (limiting viscosity index: 0.58 dL/g in dimethylformamide+1 g/l LiCl) so that the mixtures contained 14% by weight of rubber, were extruded using a conical, contra-rotating twin-shaft laboratory screw device supplied by Haake, Karlsruhe, at 117 rpm, and were granulated. The granules obtained in this manner were injection moulded to form standard small bars (injection moulding conditions: material temperature 210° C., mould temperature 60° C., injection moulding time 2.8 seconds).

| Example | 13 |
|---|---|
| Solids content after polymerisation [% by weight] | 40.6 |
| Conversion [% by weight] | 60.42 |
| Rubber content [% by weight] after polymerisation | 29.8 |
| Rubber content [% by weight] after mixing with SAN resin | 14 |
| Notched bar impact strength [kJ/m$^2$] of the mixture | 33.2 |

What is claimed is:

1. A process for producing impact-resistant thermoplastic moulding compositions, which is characterised in that a monomer mixture comprising 90 to 20 parts by weight of an aromatic monoalkenyl compound, 10 to 50 parts by weight of an ethylenically unsaturated nitrile, 0 to 30 parts by weight of other copolymerisable compounds is polymerised by a radical mechanism in the presence of 15 to 50 parts by weight, per 100 parts by weight of monomers, of a soluble, gel-free butadiene polymer, and in the presence of 50 to 200 parts by weight, per 100 parts by weight of monomers, of a solvent, wherein the solvent is selected from the group consisting of an aliphatic ($C_1$–$C_8$) or cycloaliphatic alcohol, ketone, ether, ester, nitrile (A) or mixtures thereof or a mixture of (A) with an aliphatic ($C_4$–$C_{10}$), cycloaliphatic or aromatic hydrocarbon (B) in an A:B weight ratio of 100:0 to 30:70, and the polymerisation is conducted as far as a monomer conversion of 30 to 70 wt. % with respect to the sum of the monomers and a polymer content of the total mixture comprising unreacted monomers, butadiene polymer prior to grafting solvent and polymer ABS generated during the process of 35 to 50wt. % is achieved, with thorough mixing and optionally with the subsequent addition of a regulator and initiator, so that the thermoplastic moulding composition contains 20 to 40% by weight of butadiene polymer.

2. A process as in claim 1 wherein the total content of solvent is 25 to 60% by weight.

3. A process as in claim 1 wherein the total content of said butadiene base polymer in the moulding composition is 25 to 40% by weight.

4. A process as in claim 3 wherein the total content of said butadiene base polymer in the moulding composition is 25 to 40% by weight.

5. A process as in claim 1 wherein polymerization is carried out at a temperature of 60 to 150° C.

6. A process as in claim 5 wherein polymerization is carried out at a temperature of 70 to 140° C.

7. A process as in claim 1 wherein the alcohol of group (A) is selected from the group consisting of methanol, ethanol, propanol, isopropanol, butanol, isobutanol, tert.-butanol, amyl alcohol, isoamyl alcohol, isooctanol and cyclohexanol.

8. A process as in claim 1 wherein the ketone of group (A) is selected from the group consisting of acetone, methyl ethyl ketone, methyl isopropyl ketone, cyclopentanone and cyclohexanone.

9. A process as in claim 1 wherein the ether of Group (A) is selected from the group consisting of tetrahydrofuran, dioxane, and ethylene glycol, dimethyl, diethyl, dipropyl and diisopropyl esters.

10. A process as in claim 1 wherein the ester of Group (A) is selected from the group consisting of ethyl acetate, propyl acetate and butyl acetate.

11. A process as in claim 1 wherein the nitrile of Group (A) is selected from the group consisting of acetonitrile propionitrile and butyranitrile.

12. A process as in claim 1 wherein the aliphatic hydrocarbon of Group (B) is selected from the group consisting of butane, pentane, hexane, heptane, octane and the iso derivatives thereof.

13. A process as in claim 1 wherein the cycloaliphatic hydrocarbon of Group (B) is selected from the group consisting of cyclopentane, cyclohexane, alkyl cyclopentanes, and alkyl cyclohexanes.

14. A process as in claim 1 wherein the aromatic hydrocarbon of Group (B) is selected from the group consisting of benzene, toluene, xylenes and ethylbenzene.

15. A process as in claim 1 including the step of adding colorants, anti-oxidants, and stabilizers to the mixture.

16. A process as in claim 1 wherein the aromatic monoalkenyl compounds are selected from the group consisting of styrene, α-methylstyrene, alkyl styrenes with substituted nuclei, and chlorostyrenes with substituted nuclei.

17. A process of claim 1 wherein the ethylenically unsaturated nitrites are selected from the group consisting of acrylonitrile and methacrylonitrile.

18. A process as in claim 1 wherein the initiator for radical polymerization are graft-active peroxides which decompose into radicals.

19. A process as in claim 18 wherein the initiator is selected from the group consisting of peroxy carbonates, peroxy dicarbonates, diacyl peroxides, perketals, dialkyl peroxides, azo compounds, and mixtures thereof.

* * * * *